US00RE37545E

(19) United States
(12) Reissued Patent
Chao

(10) Patent Number: US RE37,545 E
(45) Date of Reissued Patent: Feb. 12, 2002

(54) AUXILIARY LENSES FOR EYEGLASSES

(75) Inventor: Richard Chao, Chia Yi Hsien (TW)

(73) Assignees: Contour Optik, Inc., Chiayi (TW); Asahi Optical Co., Ltd.

(21) Appl. No.: 09/182,862

(22) Filed: Oct. 21, 1998

Related U.S. Patent Documents

Reissue of:
(64) Patent No.: 5,568,207
Issued: Oct. 22, 1996
Appl. No.: 08/554,854
Filed: Nov. 7, 1995

(51) Int. Cl.[7] ..... G02C 7/08; G02C 9/00
(52) U.S. Cl. ..... 351/57; 351/47
(58) Field of Search ..... 351/47, 57, 41, 351/44; 2/441, 443

(56) References Cited

U.S. PATENT DOCUMENTS

| | | | | |
|---|---|---|---|---|
| 1,679,233 | A | 7/1928 | Strauss | 351/47 |
| 2,737,847 | A | 3/1956 | Tesauro | 351/41 |
| 2,770,168 | A | 11/1956 | Tesauro | 351/41 |
| 3,498,701 | A | 3/1970 | Miller | 351/57 |
| 3,531,188 | A | 9/1970 | LeBlanc et al. | 351/48 |
| 3,531,190 | A | 9/1970 | LeBlanc | 351/113 |
| 3,536,385 | A | 10/1970 | Johnston | 351/47 |
| 3,565,517 | A | 2/1971 | Gitlin et al. | 351/106 |
| 3,582,192 | A | 6/1971 | Gitlin et al. | 351/52 |
| 3,838,914 | A | 10/1974 | Fernandez | 351/106 |
| 4,070,103 | A | 1/1978 | Meeker | 351/52 |
| 4,070,105 | A | 1/1978 | Marzouk | 351/159 |
| 4,196,981 | A | 4/1980 | Waldrop | 351/59 |
| 4,217,037 | A | 8/1980 | Lemelson | 351/47 |
| 4,547,909 | A | 10/1985 | Bell | 2/431 |
| 4,988,181 | A | 1/1991 | Riach | 351/52 |

(List continued on next page.)

FOREIGN PATENT DOCUMENTS

| | | |
|---|---|---|
| CH | 572222 | 1/1976 |
| CN | 76209045 | 9/1976 |
| CN | 107096 | 4/1985 |
| CN | 1117593 | 2/1996 |
| DE | 1797366 | 1/1971 |
| DE | G 85 07 761.5 | 6/1985 |
| DE | G 88 06 898.6 | 10/1988 |
| DE | 3905041 | 8/1990 |
| DE | 3919489 | 12/1990 |
| DE | 3920879 | 1/1991 |
| DE | 3921987 | 1/1991 |
| DE | 39333310 | 1/1991 |
| DE | 9216919 | 2/1993 |
| DE | 43 16 698 | 11/1994 |
| EP | 0469699 | 2/1992 |

(List continued on next page.)

OTHER PUBLICATIONS

English language abstract of Japanese Publication No. 55–50217.

English language abstract of Japanese Publication No. 54–111842.

English language abstract of Japanese Publication No. 54–111841.

English language abstract of Japanese Publication No. 1–136114.

(List continued on next page.)

*Primary Examiner*—Huy Mai
(74) *Attorney, Agent, or Firm*—Morgan & Finnegan, L.L.P.

(57) ABSTRACT

An eyeglass device includes a primary and an auxiliary spectacle frames for supporting lenses. The primary spectacle frame includes two legs pivotally coupled to two side extensions and includes two magnetic members secured in the rear and side portions. The auxiliary spectacle frame includes two legs engaged on the primary spectacle frame and each having a magnetic member for engaging with the magnetic members of the primary spectacle frame so as to secure the spectacle frames together and so as to prevent the auxiliary spectacle frame from moving downward relative to the primary spectacle frame.

34 Claims, 2 Drawing Sheets

U.S. PATENT DOCUMENTS

| | | | | | |
|---|---|---|---|---|---|
| 5,181,051 | A | | 1/1993 | Townsend et al. | 351/52 |
| 5,243,366 | A | | 9/1993 | Blevins | 351/57 |
| 5,321,442 | A | | 6/1994 | Albanese | 351/44 |
| 5,389,981 | A | | 2/1995 | Riach | 351/158 |
| 5,410,763 | A | | 5/1995 | Bolle | 2/436 |
| 5,416,537 | A | * | 5/1995 | Sadler | 351/47 |
| 5,642,177 | A | | 6/1997 | Nishioka | 351/47 |
| 5,682,222 | A | | 10/1997 | Chao | 351/111 |
| 5,696,571 | A | | 12/1997 | Spencer et al. | 351/47 |
| 5,737,054 | A | | 4/1998 | Chao | 351/47 |
| 5,877,838 | A | | 3/1999 | Chao | 351/47 |
| 5,882,101 | A | | 3/1999 | Chao | 351/47 |
| 5,883,688 | A | | 3/1999 | Chao | 351/47 |
| 5,883,689 | A | | 3/1999 | Chao | 351/47 |
| 5,929,964 | A | | 7/1999 | Chao | 351/47 |
| 6,012,811 | A | | 6/2000 | Chao et al. | 351/47 |
| 6,092,896 | A | | 7/2000 | Chao et al. | 351/47 |
| 6,109,747 | A | | 8/2000 | Chao | 351/47 |
| 6,170,948 | B1 | | 1/2001 | Chao | 351/47 |

FOREIGN PATENT DOCUMENTS

| | | | |
|---|---|---|---|
| EP | 0743545 | | 11/1996 |
| FR | 915421 | | 11/1946 |
| FR | 1037755 | | 9/1953 |
| FR | 1061253 | | 4/1954 |
| FR | 2483632 | | 4/1981 |
| FR | 1266652 | | 12/1981 |
| FR | 2657436 | | 7/1991 |
| GB | 846425 | | 8/1960 |
| GB | 855268 | | 11/1960 |
| JP | 44-15392 | | 7/1969 |
| JP | 54-111841 | | 9/1979 |
| JP | 54-111842 | | 9/1979 |
| JP | 55-50217 | | 4/1980 |
| JP | 56-29209 | | 3/1981 |
| JP | 57-184910 | | 11/1982 |
| JP | 612621 | | 1/1986 |
| JP | 1-136114 | | 5/1989 |
| JP | 2-109325 | | 8/1990 |
| JP | 5-157997 | | 6/1993 |
| JP | 5-40493 | | 10/1993 |
| JP | 3011174 | * | 5/1995 |
| JP | 7-128620 | | 5/1995 |
| RU | 220885 | | 6/1968 |
| TW | 274588 | | 4/1996 |
| WO | WO 90/09611 | | 8/1990 |
| WO | WO 96/23241 | | 8/1996 |

OTHER PUBLICATIONS

English language abstract of Japanese Publication No. 56–29209.

English language abstract of Japanese Publication No. 44–15392.

English language abstract of Japanese Publication No. 5–157997.

English language abstract of Japanese Publication No. 612621.

English language abstract of Japanese Publication No. 5–40493.

English language abstract of German Publication No. 9216919.

English language abstract of German Publication No. 1797366.

English language abstract of German Publication No.43 16 698.

English language abstract of German Publication No.39333310.

English language abstract of German Publication No.3921987.

English language abstract of German Publication No.3920879.

English language abstract of German Publication No.3919489.

English language abstract of German Publication No.3905041.

English language abstract of French Publication No.1266652.

English language abstract of French Publication No.1037755.

English language abstract of French Publication No.2,657,436.

English language abstract of French Publication No.2,483,632.

English language abstract of French Publication No.915,421.

English language abstract of Switzerland Publication No.572,222.

English language abstract of Russian Publication No.220885.

English language abstract of Taiwan Publication No.274588.

English language abstract of Chinese Publication No.1117593.

Documents describing Twincome in a Patent Opposition Proceeding in Germany initiated by Pentax, on or around Apr. 30, 1997.

* cited by examiner

AUXILIARY LENSES FOR EYEGLASSES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to auxiliary lenses, and more particularly to auxiliary lenses for eyeglasses.

2. Description of the Prior Art

A typical spectacle frame having an attachable one-piece slide-on rim is disclosed in U.S. Pat. No. 4,070,103 to Meeker. In Meeker, a spectacle frame includes a magnetic material secured to the peripheral portion thereof for facilitating attachment of the auxiliary lens rim cover to the spectacle frame. The lens rim cover also includes a magnetic strip for engaging with the magnetic material of the spectacle frame.

Another typical eyeglasses are disclosed in U.S. Pat. No. 5,416,537 to Sadler and comprise first magnetic members secured to the temporal portions of the frames and second magnetic members secured to the corresponding temporal portions of the auxiliary lenses.

In both of the eyeglasses, the auxiliary lenses are simply attached to the frames by magnetic materials and have no supporting members for preventing the auxiliary lenses from moving downward relative to the frames such that the auxiliary lenses may easily move downward relative to the frames and may be easily disengaged from the frames when the users conduct jogging or jumping exercises. In addition, the magnetic materials are embedded in the frames of the primary lenses and of the auxiliary lenses such that the frames should be excavated with four or more cavities for engaging with the magnetic members and such that the strength of the frames is greatly decreased.

The present invention has arisen to mitigate and/or obviate the afore-described disadvantages of the conventional spectacle frames.

SUMMARY OF THE INVENTION

The primary objective of the present invention is to provide auxiliary lenses which may be stably secured and supported on the frames.

In accordance with one aspect of the invention, there is provided an eyeglass device comprising a primary spectacle frame for supporting primary lenses therein, the primary spectacle frame including two side portions each having an extension extended therefrom for pivotally coupling a leg means thereto, the primary spectacle frame including two rear and side portions each having a projection secured thereto, the primary spectacle frame including an upper portion, a pair of first magnetic members secured in the projections respectively, an auxiliary spectacle frame for supporting auxiliary lenses therein, the auxiliary spectacle frame including two side portions each having an arm extended therefrom for extending over and for engaging with the upper portion of the primary spectacle frame, and a pair of second magnetic members secured to the arms respectively for engaging with the first magnetic members of the primary spectacle frame so as to secure the auxiliary spectacle frame to the primary spectacle frame. The arms are engaged with and supported on the upper portion of the primary spectacle frame so as to allow the auxiliary spectacle frame to be stably supported on the primary spectacle frame and so as to prevent the auxiliary spectacle frame from moving downward relative to and so as to prevent the auxiliary spectacle frame from being disengaged from the primary spectacle frame.

The projections and the first magnetic members are arranged lower than the upper portion of the primary spectacle frame, the second magnetic members are extended downward toward the projections for hooking on the primary spectacle frame so as to further secure the auxiliary spectacle frame to the primary spectacle frame. The auxiliary spectacle frame may be prevented from disengaging from the primary spectacle frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
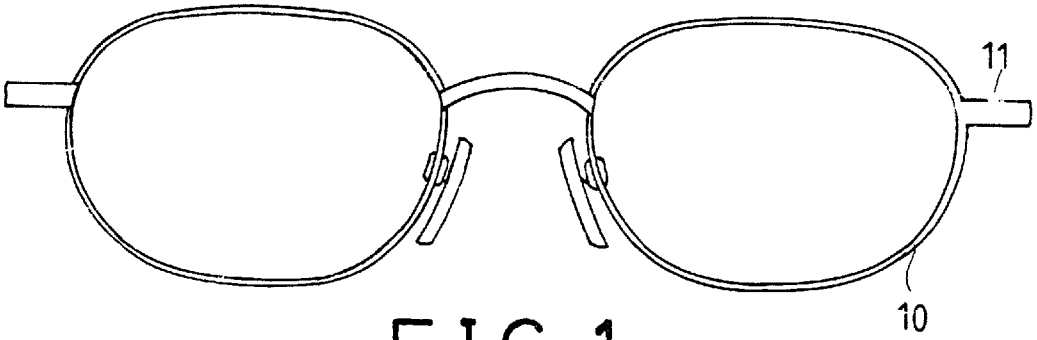
FIGS. 1 and 2 are front views of a spectacle frame and of auxiliary lenses in accordance with the present invention respectively.
Figure 2:
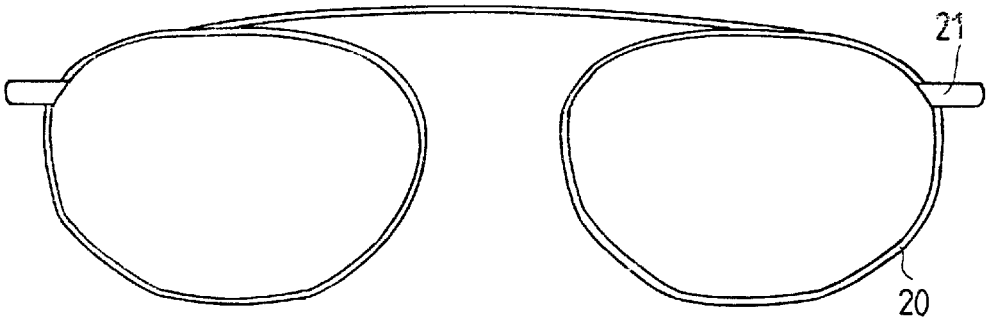
Figure 3:
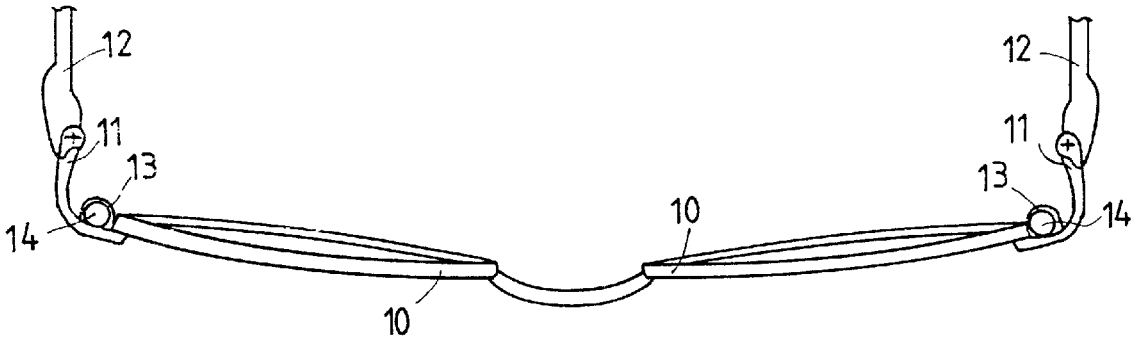
FIGS. 3 and 4 are top views of the spectacle frame and of the auxiliary lenses respectively.
Figure 4:
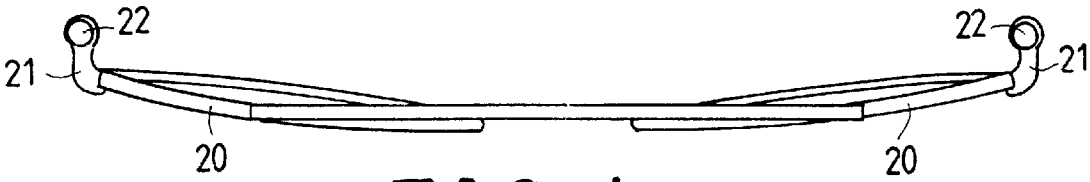
Figure 5:
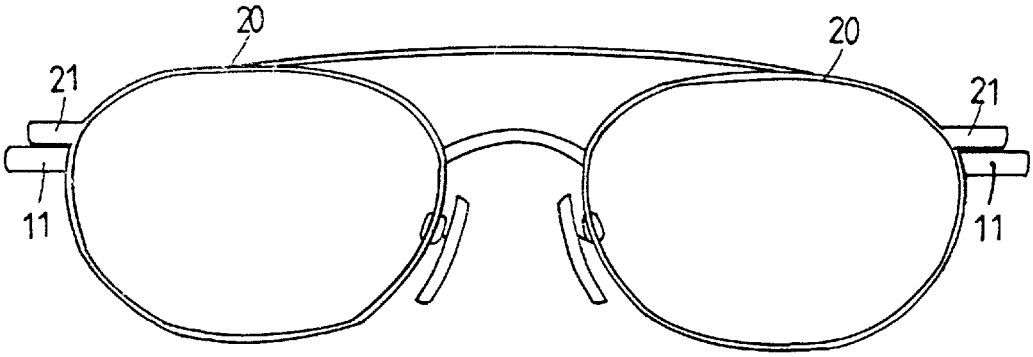
FIG. 5 is a front view of the spectacle frame and the auxiliary lenses combination.
Figure 6:
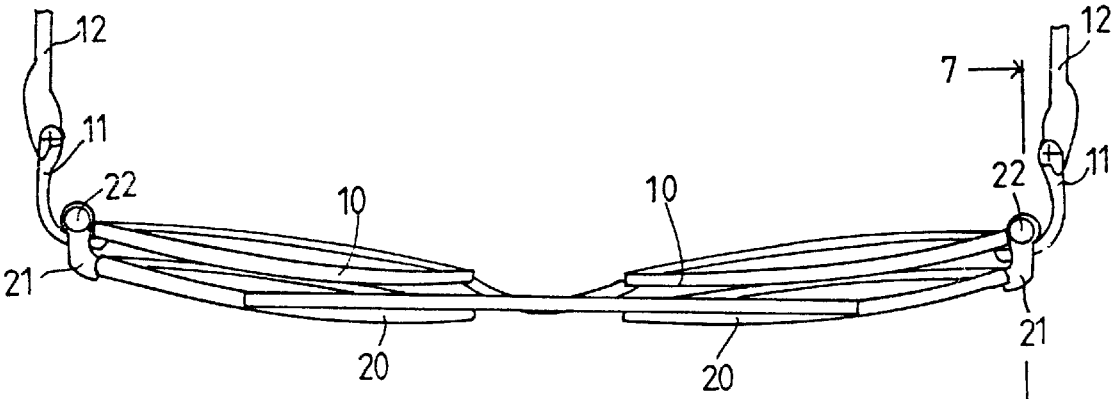
FIG. 6 is a top view of the spectacle frame and the auxiliary lenses combination.

Referring to the drawings, and initially to FIGS. 1 to 4, an eyeglass device in accordance with the present invention comprises a primary spectacle frame 10 for supporting primary lenses therein. The primary spectacle frame 10 includes two side portions each having an extension 11 extended rearward therefrom for pivotally coupling leg 12 thereto. The primary spectacle frame 10 includes two projections 13 secured to the rear and side portions thereof for supporting magnetic members 14 therein. An auxiliary spectacle frame 20 is provided for supporting the auxiliary lenses therein and includes two side portions each having an arm 21 extended rearward therefrom for extending over and for engaging with the upper portion of the primary spectacle frame 10 (FIGS. 5 and 6). The auxiliary spectacle frame 20 also includes two magnetic members 22 secured to the arms 21 therefor for engaging with the magnetic members 14 of the primary spectacle frame 10 such that the auxiliary spectacle frame 20 may be stably supported on the primary spectacle frame 10, best shown in FIGS. 5 and 6.

It is to be noted that the arms 21 are engaged with and are supported on the upper portion of the primary spectacle frame 10 such that the auxiliary spectacle frame 20 may be stably supported and secured to the primary spectacle frame 10. The auxiliary spectacle frame 20 will not move downward relative to the primary spectacle frame and will not be easily disengaged from the primary spectacle frame when the users conduct jogging or jumping exercises.

It is further to be noted that the projections 13 and the magnetic members 14 are secured to the primary spectacle frame 10 and the magnetic members 22 are secured in the arms 21. The magnetic members 14, 22 are not embedded in the frames 10, 20 such that the frames 10, 20 are not required to be formed with cavities therein and such that the strength of the frames 10, 20 will not be decreased.

*As shown in FIGS. 3–7, the engaging surfaces between magnetic members 14 in primary spectacle frame 10 and the magnetic members 22 in the auxiliary spectacle frame 20 lie in a plane that is substantially horizontal when the eyeglass device is worn.*

Figure 7:
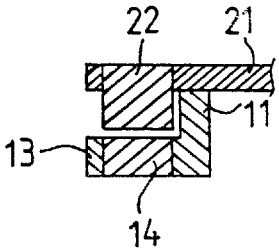
FIG. 7 is a cross sectional view taken along lines 7—7 of FIG. 6.

Referring next to FIG. 7, it is preferable that the projections 13 and the magnetic members 14 are located slightly lower than the upper portion of the primary spectacle frame 10; and the end portions of the arms 21 and/or the magnetic members 22 are slightly extended downward toward the projections 13 such that the arms 21 and the magnetic members 22 may hook on the primary spectacle frame 10 and such that the auxiliary spectacle frame 20 may further be stably supported and secured to the primary spectacle frame 10.

*In one embodiment, as shown in FIG. 7, magnetic members 14 and 22 are not in contact with each other; magnetic members 14 and 22 are engaged with, but not supported on, each other. Instead, the arm 21 securing the magnetic member 22 is supported on an upper side portion of the primary spectacle frame 10. As shown in FIG. 7, the upper side portion can be an upper part of the side portion securing the projection 13.*

Accordingly, the eyeglass device in accordance with the present invention includes an auxiliary spectacle frame that may be stably secured to the primary spectacle frame and will not move downward relative to the primary spectacle frame and will not be easily disengaged from the primary spectacle frame when the users conduct jogging or jumping exercises. In addition, the magnetic members are not embedded in the frames such that the strength of the frames will not be decreased.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass device comprising:

a primary spectacle frame for supporting primary lenses therein, said primary spectacle frame including two side portions each having an extension extended therefrom for pivotally coupling a leg means thereto, said primary spectacle frame including two rear and side portions each having a projection secured thereto, said primary spectacle frame including an upper side portion, a pair of first magnetic members secured in said projections respectively, an auxiliary spectacle frame for supporting auxiliary lenses therein, said auxiliary spectacle frame including two side portions each having an arm extended therefrom for extending over and for engaging with said upper side portion of said primary spectacle frame, and a pair of second magnetic members secured to said arms respectively for engaging with said first magnetic members of said primary spectacle frame so as to secure said auxiliary spectacle frame to said primary spectacle frame, said arms being engaged with and supported on said upper side portion of said primary spectacle frame so as to allow said auxiliary spectacle frame to be stably supported on said primary spectacle frame and so as to prevent said auxiliary spectacle frame from moving downward relative to said primary spectacle frame and so as to prevent said auxiliary spectacle frame from being disengaged from said primary spectacle frame.

2. An eyeglass device according to claim 1, wherein said projections and said first magnetic members are arranged lower than said upper side portion of said primary spectacle frame, said second magnetic members are extended downward toward said projections for hooking on said primary spectacle frame so as to further secure said auxiliary spectacle frame to said primary spectacle frame.

*3. An eyeglass device as recited in claim 1 wherein the first and the second magnetic members are magnets.*

*4. An eyeglass device comprising:*

*a primary spectacle frame for supporting primary lenses therein with the lenses defining a vertical plane, the primary spectacle frame including two side portion extensions extended therefrom for pivotally coupling a leg thereto and a first magnet having a horizontal surface and secured to said side portion extensions of the primary spectacle frame, and*

*an auxiliary spectacle frame for supporting auxiliary lenses therein, and for disposing in front of the primary spectacle frame, the auxiliary spectacle frame including two auxiliary side portions, the auxiliary spectacle frame including two second magnets, each secured to one of the auxiliary side portions for respectively engaging the horizontal surface of one of the first magnets so as to secure the auxiliary spectacle frame to the primary spectacle frame.*

*5. An eyeglass device as recited in claim 4 wherein at least an end portion of one auxiliary side portion extends downward toward one of the side portions of the primary spectacle frame for hooking on the primary spectacle frame such that the auxiliary spectacle frame is further stably supported and secured to the primary spectacle frame.*

*6. An eyeglass device comprising:*

*a primary spectacle frame for supporting primary lenses therein;*

*the primary spectacle frame including two side portion extensions extended therefrom for pivotally coupling a leg thereto; and*

*the primary spectacle frame including two first magnetic members respectively having a horizontal surface and being secured to one of the side portions extensions of the primary spectacle frame; and*

*an auxiliary spectacle frame for supporting auxiliary lenses therein, and for disposing in front of the primary spectacle frame, the auxiliary spectacle frame including two auxiliary side portions, wherein the auxiliary spectacle frame further includes two second magnetic members each secured to one of the auxiliary side portions and having a horizontal surface for coupling a corresponding horizontal surface of one of the first magnetic members so as to secure the auxiliary spectacle frame to the primary spectacle frame.*

*7. An eyeglass device as recited in claim 6 wherein the second magnetic members are magnets.*

*8. An eyeglass device as recited in claim 6 wherein the first magnetic members are magnets.*

*9. An eyeglass device as recited in claim 6 wherein the first and the second magnetic members are magnets.*

*10. An eyeglass device as recited in claim 9 wherein the auxiliary side portions are respectively supported on a corresponding extension and the first magnetic members are not in contact with the second magnetic members.*

*11. An eyeglass device as recited in claim 6 wherein the auxiliary side portions are respectively supported on a corresponding extension and the first magnetic members are not in contact with the second magnetic members.*

*12. An eyeglass device comprising:*

*a primary spectacle frame having two side portion extensions, each of said extensions having a front side, a rear side and a first magnetic member secured to said rear side,*

*an auxiliary spectacle frame including two side portions each having an arm extended therefrom for extending toward and beyond said rear side, each of said arms containing a second magnetic member, and*

*said arms and said first and second magnetic members cooperating to stably support said auxiliary spectacle frame on said primary spectacle frame.*

*13. The eyeglass device according to claim 12, wherein said first and second magnets members are magnets.*

*14. An eyeglass device comprising:*

*a primary spectacle frame for supporting primary lenses therein, said primary spectacle frame including two side portion extensions extended therefrom for pivotally coupling a leg, each of said extensions also including an outer side, an inner side, and a top side with a projection secured to said inner side, each of said projections respectively securing a first magnetic member, and*

*an auxiliary spectacle frame for supporting auxiliary lenses therein, said auxiliary spectacle frame including two side portions each having an arm extended therefrom, said auxiliary spectacle frame further including a pair of second magnetic members secured to said arms respectively for engaging said first magnetic members of said primary spectacle, each of said arms adapted to extend over one of said top sides.*

*15. The eyeglass device according to claim 14, wherein said first and second magnets members are magnets.*

*16. An eyeglass device comprising:*

*a primary spectacle frame having two side portion extensions, each of said extensions having a front side and a rear side with a first magnetic member secured to said rear side, and*

*an auxiliary spectacle frame including two side portions, each of said side portions having an arm extended therefrom for extending beyond said rear side, said arms containing corresponding second magnetic members, said arms and said first and second magnetic members supporting said auxiliary spectacle frame on said primary spectacle frame.*

*17. An eyeglass device comprising:*

*a primary spectacle frame having two side portion extensions, each of said extensions extending laterally away from one another and rearwardly of said frame, each of said extensions having a top side, a front side and a rear side with a first magnetic member secured to said rear side, and*

*an auxiliary spectacle frame including two side portions each having an arm extending from said front side over said top side, said arms containing corresponding second magnetic members, said arms and said first and second magnetic members supporting said auxiliary spectacle frame on said primary spectacle frame.*

*18. An eyeglass device comprising:*

*a primary spectacle frame having two side portion extensions extending rearwardly therefrom having a top side and a rear side with a first magnetic member secured thereto, and*

*an auxiliary spectacle frame including two arms for extending over a corresponding top side of said extensions, said arms respectively containing second magnetic members for cooperation with said first magnetic members and downwardly extended end portions for hooking said auxiliary spectacle frame to said primary spectacle frame, said arms and said first and second magnetic members supporting said auxiliary spectacle frame on said primary spectacle frame.*

*19. An eyeglass device comprising:*

*a primary spectacle frame for supporting primary lenses therein having two side portion extensions, said side portion extensions each having a top side and a projection attached to a rear side thereof, each of said projections securing a first magnetic member, and*

*an auxiliary spectacle frame including two arms for extending over and engaging a corresponding top side of said side portion extensions, said arms respectively containing second magnetic members and downwardly extended end portions, at least said arms and said first and second magnetic members supporting said auxiliary spectacle frame on said primary spectacle frame.*

*20. An eyeglass device comprising:*

*a primary spectacle frame for supporting primary lenses therein having two side portion extensions having a top side and a rear side with a first magnetic member secured to said rear side, and*

*an auxiliary spectacle frame including two arms for extending over and engaging a corresponding top side of said extensions, said arms respectively containing downwardly extended second magnetic members for hooking said auxiliary spectacle frame to said primary spectacle frame, said arms and said first and second magnetic members cooperating to support said auxiliary spectacle frame on said primary spectacle frame.*

*21. An eyeglass device comprising:*

*a primary spectacle frame for supporting primary lenses therein having an extension at each side for pivotal coupling to a leg, each of said extensions having a front side, a rear side, a top side and a projection attached to said rear side, each of said projections securing first magnetic members, and*

*an auxiliary spectacle frame for supporting auxiliary lenses therein and including two side portions, each of said side portions having an arm extended therefrom and adapted to extend from said front side to beyond said rear side of said extension of said primary spectacle frame, said arms each containing corresponding second magnetic members, said arms locating each of said second magnetic members in an engagement position to engage respective first magnetic members of said primary spectacle frame and inhibit relative vertical movement therebetween.*

*22. An eyeglass device comprising:*

*a primary spectacle frame for supporting primary lenses therein and having two side portion extensions extending rearwardly therefrom and having a front side, a rear side, a top side, and a rear end, each of said rear ends pivotally coupling a leg configured to conform to a user at a distal end thereof, each of said extensions of said primary spectacle frame further having a projection attached to each of said rear sides, and a pair of first magnetic members respectively secured in said projections, said first magnetic members capable of engaging second magnetic members of an auxiliary spectacle frame so that lenses of an auxiliary spectacle frame are located in front of said primary lenses.*

*23. An eyeglass device comprising:*

*an auxiliary spectacle frame for supporting auxiliary lenses therein, said frame including a front side, a rear side, and oppositely positioned side portions, each of said side portions having an arm extended therefrom, each of said arms having a rearwardly directed free end for securing a magnetic member, and a pair of magnetic members respectively secured in the free ends of*

*said arms, said arms and said pair of magnetic members adapted to extend across respective side portions of a primary spectacle frame so that said pair of magnetic members can vertically engage corresponding magnetic members on a primary spectacle frame.*

*24. An eyeglass device comprising:*

*an auxiliary spectacle frame for supporting auxiliary lenses therein, said frame including a front side, a rear side, and oppositely positioned side portions, each of said side portions having an arm extended therefrom, each of said arms having a rearwardly directed end for securing a magnetic member, a pair of magnetic members respectively located at said ends of said arms, each of said ends further including a downwardly extended end portion for hooking onto a primary spectacle, said arms and said pair of magnetic members adapted to extend across respective side portions of a primary spectacle frame so that said pair of magnetic members can engage corresponding magnetic members on a primary spectacle frame.*

*25. An eyeglass device comprising:*

*a primary spectacle frame having two side portion extensions extending therefrom and adapted to pivotally couple a leg thereto, said extensions each having a front side, a rear side, a top side and a projection extending from said rear side, each of said projections securing a first magnetic member, and*

*an auxiliary spectacle frame including two side portions each having an arm extended therefrom for extending over said top side, said arms containing corresponding second magnetic members, said arms with said second magnetic members engaging said first magnetic members thereby securing said auxiliary frame to said primary spectacle frame to prevent said auxiliary spectacle frame from moving downward relative to and/or disengaging from said primary spectacle frame.*

*26. An eyeglass device, comprising:*

*a primary spectacle frame for supporting primary lenses therein;*

*a pair of extensions mounted to said primary spectacle frame at laterally spaced locations and each projecting toward a wearer when the eyeglass device is worn;*

*a first pair of magnetic members, each affixed to a respective one of a pair of projections attached to a rear side of said extensions so as to be concealed by said extensions when said eyeglass is worn, said first pair of magnetic members each having a first surface;*

*an auxiliary spectacle frame for supporting auxiliary lenses therein;*

*a pair of spaced apart arms mounted to said auxiliary spectacle frame and projecting toward the wearer when the eyeglass device is worn; and*

*a second pair of magnetic members, each affixed to said pair of arms, said second pair of magnetic members each having a second surface, said auxiliary spectacle frame capable of being supported by said primary spectacle frame by mounting said second pair of magnetic members to said first pair of magnetic members, said first and second surfaces being oppositely directed so that said surfaces are juxtaposed.*

*27. An eyeglass device according to claim 26 wherein said auxiliary frame includes an abutment surface for engagement with an oppositely directed surface on said primary frame to inhibit relative movement therebetween.*

*28. An eyeglass device according to claim 27 wherein said abutment surface is provided on each of said arms on said auxiliary frame.*

*29. An eyeglass device according to claim 27 wherein said extensions are located adjacent respective ones of said arms.*

*30. An eyeglass device according to claim 29 wherein said auxiliary frame includes an abutment surface for engagement with an oppositely directed surface on said primary frame to inhibit relative movement therebetween.*

*31. An eyeglass device comprising:*

*a primary spectacle frame having two side portion extensions extending rearwardly therefrom with a top side and a rear side with a first magnetic member secured thereto, and*

*an auxiliary spectacle frame including two arms for extending over a corresponding top side of said extensions, said arms respectively containing second magnetic members for cooperation with said first magnetic members and downwardly extended end portions for hooking said auxiliary spectacle frame to said primary spectacle frame, said arms and said first and second magnetic members supporting said auxiliary spectacle frame on said primary spectacle frame, wherein at least one of said first magnetic members and said second magnetic members are magnets.*

*32. An eyeglass device comprising:*

*a primary spectacle frame having two side portion extensions, each of said extensions having a front side, a rear side and a first magnetic member secured to said rear side,*

*an auxiliary spectacle frame including two side portions each having an arm extended therefrom and traversing said extension from said front side to said rear side, each of said arms containing a second magnetic member, and*

*said first and second magnetic members engaging one another to support said auxiliary spectacle frame on said primary spectacle frame.*

*33. An eyeglass device comprising:*

*a primary spectacle frame having two side portion extensions, each of said extensions having a front side, a rear side and a first magnetic member secured to said rear side,*

*an auxiliary spectacle frame including two side portions each having an arm extended therefrom, each of said arms containing a second magnetic member, said arms extending across said extension from said front side to said rear side, and*

*said arms and said first and second magnetic members stably support said auxiliary spectacle frame on said primary spectacle frame.*

*34. An eyeglass device comprising:*

*a primary spectacle frame having two side portion extensions with a front side, a rear side and a first magnetic member*

*an auxiliary spectacle frame including two side portions each having an arm extended therefrom, each of said arms containing a second magnetic member, said arms extending across a respective extension from said front side to said rear side so that said first and second magnetic members engage one another whereby said auxiliary spectacle frame is supported by said primary spectacle frame.*

* * * * *

US00RE37545F1

(12) EX PARTE REEXAMINATION CERTIFICATE (6678th)

United States Patent

Chao

(10) Number: US RE37,545 F1

(45) Certificate Issued: Mar. 3, 2009

(54) AUXILIARY LENSES FOR EYEGLASSES

(75) Inventor: Richard Chao, Chia Yi Hsien (TW)

(73) Assignee: Aspex Eyewear, Inc., Miramar, FL (US)

Reexamination Request:
No. 90/008,864, Sep. 13, 2007

Reexamination Certificate for:

| | |
|---|---|
| Patent No.: | **Re. 37,545** |
| Issued: | **Feb. 12, 2002** |
| Appl. No.: | **09/182,862** |
| Filed: | **Oct. 21, 1998** |

Related U.S. Patent Documents

Reissue of:

| | |
|---|---|
| (64) Patent No.: | **5,568,207** |
| Issued: | **Oct. 22, 1996** |
| Appl. No.: | **08/554,854** |
| Filed: | **Nov. 7, 1995** |

(51) Int. Cl.
*G02C 07/08* (2006.01)
*G02C 09/00* (2006.01)

(52) U.S. Cl. ..... 351/57; 351/47

(58) Field of Classification Search ..... None
See application file for complete search history.

(56) References Cited

U.S. PATENT DOCUMENTS

| | | | |
|---|---|---|---|
| 188,246 | A | 3/1877 | Johnson |
| 1,613,765 | A | 1/1927 | Nerney |
| 1,679,233 | A | 7/1928 | Strauss |
| 1,907,749 | A | 5/1933 | Dechau |
| 1,936,319 | A | 11/1933 | Wingate |
| 2,065,122 | A | 12/1936 | Diggins |
| 2,117,436 | A | 5/1938 | Lindblom |
| 2,141,063 | A | 12/1938 | Euler |
| 2,254,637 | A | 9/1941 | Welsh |
| 2,492,072 | A | 12/1949 | Tapner |
| 2,587,472 | A | 2/1952 | Hoffmaster |
| D170,435 | S | 9/1953 | Weissman |
| 2,737,847 | A | 3/1956 | Tessauro |
| 2,770,168 | A | 11/1956 | Tessauro |
| 3,498,701 | A | 3/1970 | Miller |

(Continued)

FOREIGN PATENT DOCUMENTS

| | | |
|---|---|---|
| CA | 773287 | 12/1967 |
| CH | 572222 | 1/1976 |
| CN | 1117593 | 2/1996 |
| DE | 1797366 | 1/1971 |
| DE | G 85 87 761.5 | 6/1985 |
| DE | G 88 06 898.6 | 10/1988 |
| DE | 3905041 | 8/1990 |
| DE | 3920879 | 1/1991 |
| DE | 3921987 | 1/1991 |
| DE | 39333310 | 1/1991 |
| DE | G 92 16 919.8 | 2/1993 |
| DE | 43 16 698 | 11/1994 |
| DE | 29518590 | 11/1995 |
| EP | 0469699 | 2/1992 |
| EP | 0502796 B1 | 2/1995 |

(Continued)

OTHER PUBLICATIONS

"Twincome–Pentax Documents" Describing Twincome in A Patent Opposition in Germany initiated by Pentax, on or about Apr. 30, 1997.

*Primary Examiner*—Glenn K. Dawson

(57) ABSTRACT

An eyeglass device includes a primary and an auxiliary spectacle frames for supporting lenses. The primary spectacle frame includes two legs pivotally coupled to two side extensions and includes two magnetic members secured in the rear and side portions. The auxiliary spectacle frame includes two legs engaged on the primary spectacle frame and each having a magnetic member for engaging with the magnetic members of the primary spectacle frame so as to secure the spectacle frames together and so as to prevent the auxiliary spectacle frame from moving downward relative to the primary spectacle frame.

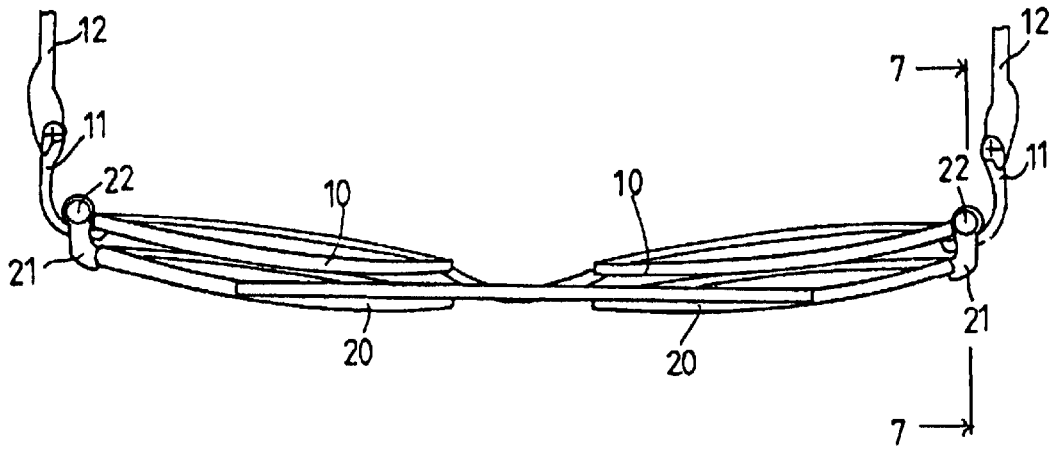

U.S. PATENT DOCUMENTS

| | | | | |
|---|---|---|---|---|
| 3,531,188 | A | | 9/1970 | LeBlanc et al. |
| 3,531,190 | A | | 9/1970 | LeBlanc |
| 3,536,385 | A | | 10/1970 | Johnston |
| 3,565,517 | A | | 2/1971 | Gitlin et al. |
| 3,582,192 | A | | 6/1971 | Gitlin et al. |
| D221,480 | S | | 8/1971 | Tagnon |
| 3,838,914 | A | | 10/1974 | Fernandez |
| 4,021,892 | A | | 5/1977 | Piper |
| 4,070,103 | A | | 1/1978 | Meeker |
| 4,070,105 | A | | 1/1978 | Marzouk |
| 4,196,981 | A | | 4/1980 | Waldrop |
| 4,217,037 | A | | 8/1980 | Lemelson |
| 4,380,379 | A | | 4/1983 | Ahern |
| 4,432,616 | A | | 2/1984 | Kurosaka |
| 4,466,713 | A | | 8/1984 | Tanaka |
| 4,547,909 | A | | 10/1985 | Bell |
| 4,685,782 | A | | 8/1987 | Lhospice |
| D291,808 | S | | 9/1987 | Meyerspeer |
| 4,822,158 | A | | 4/1989 | Porsche |
| 4,878,749 | A | | 11/1989 | McGee |
| D307,756 | S | | 5/1990 | Porsche |
| 4,988,181 | A | | 1/1991 | Riach |
| 5,181,051 | A | | 1/1993 | Townsend et al. |
| 5,243,366 | A | | 9/1993 | Blevins |
| 5,321,442 | A | * | 6/1994 | Albanese ..... 351/44 |
| 5,389,981 | A | | 2/1995 | Riach |
| 5,410,763 | A | | 5/1995 | Bolle |
| 5,416,537 | A | | 5/1995 | Sadler |
| 5,642,177 | A | | 6/1997 | Nishioka |
| 5,682,222 | A | | 10/1997 | Chao |
| 5,684,558 | A | | 11/1997 | Hamamoto |
| 5,696,571 | A | | 12/1997 | Spencer et al. |
| 5,710,614 | A | | 1/1998 | Cereda |
| 5,724,118 | A | | 3/1998 | Krebs |
| 5,737,054 | A | | 4/1998 | Chao |
| 5,867,244 | A | | 2/1999 | Martin |
| 5,877,838 | A | | 3/1999 | Chao |
| 5,882,101 | A | | 3/1999 | Chao |
| 5,883,688 | A | | 3/1999 | Chao |
| 5,883,689 | A | | 3/1999 | Chao |
| 5,889,574 | A | | 3/1999 | Gandl-Schiller |
| 5,912,718 | A | | 6/1999 | Murai et al. |
| 5,914,768 | A | | 6/1999 | Hyoi |
| 5,929,964 | A | | 7/1999 | Chao |
| 6,012,811 | A | | 1/2000 | Chao et al. |
| 6,092,896 | A | | 7/2000 | Chao et al. |
| 6,109,747 | A | | 8/2000 | Chao |
| 6,149,269 | A | | 11/2000 | Madison |
| 6,170,948 | B1 | | 1/2001 | Chao |
| 7,040,751 | B2 | | 5/2006 | Madison |

FOREIGN PATENT DOCUMENTS

| | | | |
|---|---|---|---|
| EP | 0743545 | | 11/1996 |
| FR | 915421 | | 11/1946 |
| FR | 1037755 | | 9/1953 |
| FR | 1061253 | | 4/1954 |
| FR | 2483632 | | 4/1981 |
| FR | 1266652 | | 12/1981 |
| FR | 2657436 | | 7/1991 |
| GB | 846425 | | 8/1960 |
| GB | 855268 | | 11/1960 |
| JP | 57-184910 | | 5/1956 |
| JP | 44-15392 | | 7/1969 |
| JP | 54-111841 | | 9/1979 |
| JP | 54-111842 | | 9/1979 |
| JP | 54-163052 | | 12/1979 |
| JP | 55-50217 | | 4/1980 |
| JP | 55-083022 | | 6/1980 |
| JP | 55-133014 | | 10/1980 |
| JP | 55-135814 | | 10/1980 |
| JP | 56-29209 | | 3/1981 |
| JP | 56-925214 | | 8/1981 |
| JP | 56-153317 | | 11/1981 |
| JP | 57-178215 | | 11/1982 |
| JP | 57-184910 | | 11/1982 |
| JP | 61-2621 | | 1/1986 |
| JP | 63-188626 | | 12/1988 |
| JP | 1-136114 | | 5/1989 |
| JP | 2-109325 | | 8/1990 |
| JP | 5-157997 | | 6/1993 |
| JP | 05-196899 | | 8/1993 |
| JP | 5-40493 | | 10/1993 |
| JP | 05-289029 | | 11/1993 |
| JP | 06-265828 | | 9/1994 |
| JP | 06-331943 | | 12/1994 |
| JP | 07-028001 | | 1/1995 |
| JP | 07-101722 | | 2/1995 |
| JP | 07-056123 | | 3/1995 |
| JP | 3011174 | | 5/1995 |
| JP | 7-128620 | | 5/1995 |
| JP | 07-156856 | | 5/1995 |
| JP | 07-244259 | | 9/1995 |
| JP | 08-050263 | | 2/1996 |
| JP | 9-043544 | A | 2/1997 |
| RU | 220885 | | 6/1968 |
| TW | 274588 | | 4/1996 |
| WO | WO 90/09611 | | 8/1990 |
| WO | WO-95/18986 | | 7/1995 |
| WO | WO-95/23995 | | 9/1995 |
| WO | WO 96/23241 | | 8/1996 |

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

Claims 1–9, 12, 13, 16–20, 24, and 31–33 is confirmed.

Claims 23 and 34 are determined to be patentable as amended.

New claim 35 is added and determined to be patentable.

Claims 10, 11, 14, 15, 21, 22 and 25–30 were not reexamined.

*23. An eyeglass device comprising:*

*an auxiliary spectacle frame for supporting auxiliary lenses therein, said frame including a front side, a rear side, and oppositely positioned side portions, each of said side portions having an arm extended therefrom, each of said arms having a rearwardly directed free end for securing a magnetic member* having a horizontal surface, *and a pair of magnetic members respectively secured in the free ends of said arms, said arms and said pair of magnetic members adapted to extend across respective side portions of a primary spectacle frame so that said pair of magnetic members* having a horizontal surface *can vertically engage corresponding magnetic* [[members]] member surfaces *on a primary spectacle frame.*

*34. An eyeglass device comprising:*

*a primary spectacle frame having two side portion extensions with a front side, a rear side and a first magnetic member* at said rear side,

*an auxiliary spectacle frame including two side portions each having an arm extended therefrom, each of said arms containing a second magnetic member, said arms extending across a respective extension from said front side to said rear side so that said first and second magnetic members engage one another whereby said auxiliary spectacle frame is supported by said primary spectacle frame.*

35. The eyeglass device according to claim 23, wherein, said magnetic members of said auxiliary spectacle frame are magnets.

* * * * *

US00RE37545C2

(12) EX PARTE REEXAMINATION CERTIFICATE (8079th)

United States Patent

Chao

(10) Number: US RE37,545 C2

(45) Certificate Issued: Mar. 8, 2011

(54) AUXILIARY LENSES FOR EYEGLASSES

(75) Inventor: Richard Chao, Chia Yi Hsien (TW)

(73) Assignee: Aspex Eyewear, Inc., Miramar, FL (US)

Reexamination Request:
No. 90/009,451, Apr. 14, 2009

Reexamination Certificate for:

| | |
|---|---|
| Patent No.: | **Re. 37,545** |
| Issued: | **Feb. 12, 2002** |
| Appl. No.: | **09/182,862** |
| Filed: | **Oct. 21, 1998** |

Reexamination Certificate C1 Re. 37,545 issued Mar. 3, 2009

Related U.S. Patent Documents

Reissue of:

| | |
|---|---|
| (64) Patent No.: | **5,568,207** |
| Issued: | **Oct. 22, 1996** |
| Appl. No.: | **08/554,854** |
| Filed: | **Nov. 7, 1995** |

(51) Int. Cl.
*G02C 7/08* (2006.01)
*G02C 9/00* (2006.01)

(52) U.S. Cl. ..... 351/57; 351/47

(58) Field of Classification Search ..... None
See application file for complete search history.

(56) References Cited

U.S. PATENT DOCUMENTS

| | | | |
|---|---|---|---|
| 188,246 | A | 3/1877 | Johnson |
| 1,613,765 | A | 1/1927 | Nemey |
| 1,679,233 | A | 7/1928 | Strauss |
| 1,907,749 | A | 5/1933 | Dechau |
| 1,936,319 | A | 11/1933 | Wingate |
| 2,065,122 | A | 12/1936 | Diggins |
| 2,117,436 | A | 5/1938 | Lindblom |
| 2,141,063 | A | 12/1938 | Euler |
| 2,254,637 | A | 9/1941 | Welsh |
| 2,492,072 | A | 12/1949 | Tapner |
| 2,587,472 | A | 2/1952 | Hoffmaster |
| D170,435 | S | 9/1953 | Weissman |
| 2,737,847 | A | 3/1956 | Tessauro |
| 2,770,168 | A | 11/1956 | Tessauro |
| 3,498,701 | A | 3/1970 | Miller |

(Continued)

FOREIGN PATENT DOCUMENTS

| | | |
|---|---|---|
| CA | 773287 | 12/1967 |
| CH | 572222 | 1/1976 |
| CN | 76209045 | 9/1976 |
| CN | 107096 | 4/1985 |
| CN | 1117593 A | 2/1996 |
| DE | 1797366 | 1/1971 |
| DE | G 85 07 761.5 | 6/1985 |
| DE | G 88 06 898.6 | 10/1988 |
| DE | 3905041 A1 | 8/1990 |
| DE | 3919489 A1 | 12/1990 |

(Continued)

OTHER PUBLICATIONS

"Twincome–Pentax Documents" Describing Twincome in A Patent Opposition in Germany Initiated by Pentax, on or about Apr. 30, 1997.

*Primary Examiner*—Jimmy T Nguyen

(57) ABSTRACT

An eyeglass device includes a primary and an auxiliary spectacle frames for supporting lenses. The primary spectacle frame includes two legs pivotally coupled to two side extensions and includes two magnetic members secured in the rear and side portions. The auxiliary spectacle frame includes two legs engaged on the primary spectacle frame and each having a magnetic member for engaging with the magnetic members of the primary spectacle frame so as to secure the spectacle frames together and so as to prevent the auxiliary spectacle frame from moving downward relative to the primary spectacle frame.

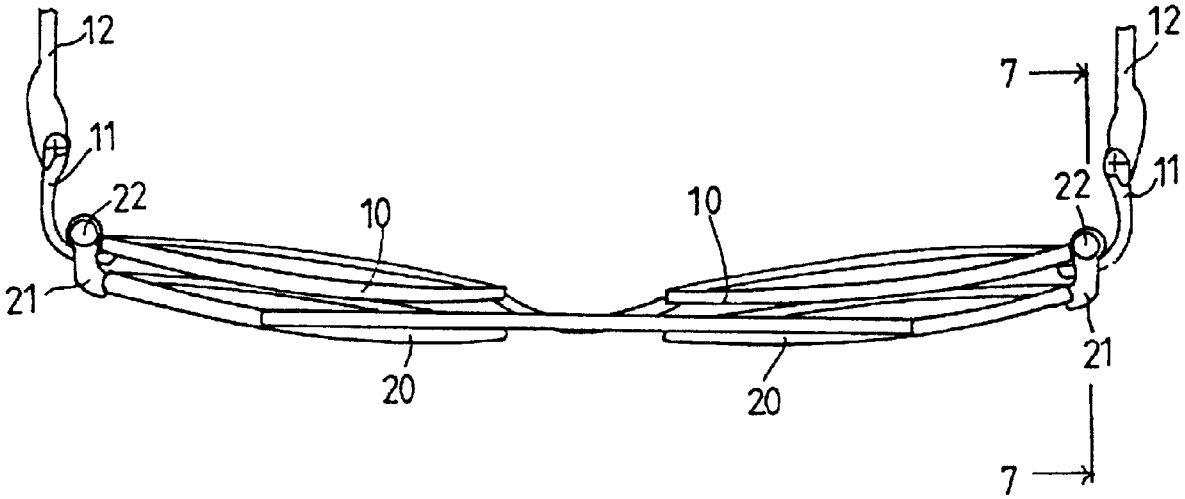

U.S. PATENT DOCUMENTS

| | | | |
|---|---|---|---|
| 3,531,188 | A | 9/1970 | LeBlanc et al. |
| 3,531,190 | A | 9/1970 | LeBlanc |
| 3,536,385 | A | 10/1970 | Johnston |
| 3,565,517 | A | 2/1971 | Gitlin et al. |
| 3,582,192 | A | 6/1971 | Gitlin et al. |
| D221,480 | S | 8/1971 | Tagnon |
| 3,838,914 | A | 10/1974 | Fernandez |
| 4,021,892 | A | 5/1977 | Piper |
| 4,070,103 | A | 1/1978 | Meeker |
| 4,070,105 | A | 1/1978 | Marzouk |
| 4,196,981 | A | 4/1980 | Waldrop |
| 4,217,037 | A | 8/1980 | Lemelson |
| 4,380,379 | A | 4/1983 | Ahern |
| 4,432,616 | A | 2/1984 | Kurosaka |
| 4,466,713 | A | 8/1984 | Tanaka |
| 4,547,909 | A | 10/1985 | Bell |
| 4,685,782 | A | 8/1987 | Lhospice |
| D291,808 | S | 9/1987 | Meyerspeer |
| 4,822,158 | A | 4/1989 | Porsche |
| 4,878,749 | A | 11/1989 | McGee |
| D307,756 | S | 5/1990 | Porsche |
| 4,988,181 | A | 1/1991 | Riach |
| 5,181,051 | A | 1/1993 | Townsend et al. |
| 5,243,366 | A | 9/1993 | Blevins |
| 5,321,442 | A | 6/1994 | Albanese |
| 5,389,981 | A | 2/1995 | Riach |
| 5,410,763 | A | 5/1995 | Bolle |
| 5,416,537 | A | 5/1995 | Sadler |
| 5,461,432 | A | 10/1995 | Huang |
| 5,642,177 | A | 6/1997 | Nishioka |
| 5,682,222 | A | 10/1997 | Chao |
| 5,684,558 | A | 11/1997 | Hamamoto |
| 5,696,571 | A | 12/1997 | Spencer et al. |
| 5,710,614 | A | 1/1998 | Cereda |
| 5,724,118 | A | 3/1998 | Krebs |
| 5,737,054 | A | 4/1998 | Chao |
| 5,877,838 | A | 3/1999 | Chao |
| 5,882,101 | A | 3/1999 | Chao |
| 5,883,688 | A | 3/1999 | Chao |
| 5,883,689 | A | 3/1999 | Chao |
| 5,889,574 | A | 3/1999 | Gandl-Schiller |
| 5,912,718 | A | 6/1999 | Murai et al. |
| 5,914,768 | A | 6/1999 | Hyoi |
| 5,929,964 | A | 7/1999 | Chao |
| 6,012,811 | A | 1/2000 | Chao et al. |
| 6,092,896 | A | 7/2000 | Chao et al. |
| 6,109,747 | A | 8/2000 | Chao |
| 6,149,269 | A | 11/2000 | Madison |
| 6,170,948 | B1 | 1/2001 | Chao |
| 7,040,751 | B2 | 5/2006 | Madison |
| 6,109,747 | C1 | 10/2009 | Chao |

FOREIGN PATENT DOCUMENTS

| | | | |
|---|---|---|---|
| DE | 3920879 | A1 | 1/1991 |
| DE | 3921987 | A1 | 1/1991 |
| DE | 39333310 | A1 | 1/1991 |
| DE | G 92 16 919.8 | | 2/1993 |
| DE | 43 16 698 | A1 | 11/1994 |
| DE | 29518590 | | 11/1995 |
| EP | 0 469 699 | A1 | 2/1992 |
| EP | 0502796 | B1 | 2/1995 |
| EP | 0743545 | A1 | 11/1996 |
| FR | 915421 | | 11/1946 |
| FR | 1037755 | | 9/1953 |
| FR | 1061253 | | 4/1954 |
| FR | 2483632 | | 4/1981 |
| FR | 1266652 | | 12/1981 |
| FR | 2657436 | | 7/1991 |
| GB | 846425 | | 8/1960 |
| GB | 855268 | | 11/1960 |
| JP | 44-15392 | | 7/1969 |
| JP | 54-111841 | | 9/1979 |
| JP | 54-111842 | | 9/1979 |
| JP | 54-163052 | | 12/1979 |
| JP | 55-50217 | | 4/1980 |
| JP | 55-083022 | | 6/1980 |
| JP | 55-133014 | | 10/1980 |
| JP | 55-135814 | | 10/1980 |
| JP | 56-29209 | | 3/1981 |
| JP | 56-095214 | | 8/1981 |
| JP | 56-153317 | | 11/1981 |
| JP | 57-178215 | | 11/1982 |
| JP | 57-184910 | | 11/1982 |
| JP | 61-2621 | | 1/1986 |
| JP | 63-188626 | | 12/1988 |
| JP | 1-136114 | | 5/1989 |
| JP | 2-109325 | | 8/1990 |
| JP | 5-40493 | | 1/1993 |
| JP | 5-157997 | | 6/1993 |
| JP | 05-196899 | | 8/1993 |
| JP | 05-289029 | | 11/1993 |
| JP | 06-265828 | | 9/1994 |
| JP | 06-331943 | | 12/1994 |
| JP | 07-028001 | | 1/1995 |
| JP | 07-010722 | | 2/1995 |
| JP | 07-056123 | | 3/1995 |
| JP | 3011174 | | 5/1995 |
| JP | 7-128620 | | 5/1995 |
| JP | 07-244259 | | 9/1995 |
| JP | 08-050263 | | 2/1996 |
| JP | 9043544 | A | 2/1997 |
| JP | 9061754 | A | 3/1997 |
| JP | 07-156856 | | 4/1997 |
| JP | 9101489 | A | 4/1997 |
| SU | 220885 | | 6/1968 |
| TW | 274588 | | 4/1996 |
| WO | WO-90/09611 | | 8/1990 |
| WO | WO-95/18986 | | 7/1995 |
| WO | WO-95/23995 | | 9/1995 |
| WO | WO-96/23241 | | 8/1996 |

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 22 is confirmed.

Claims 1-21 and 23-35 were not reexamined.

* * * * *